US006940618B2

(12) United States Patent
Kinas

(10) Patent No.: US 6,940,618 B2
(45) Date of Patent: Sep. 6, 2005

(54) LINEFEED CALIBRATION METHOD FOR A PRINTER

(75) Inventor: Erick Kinas, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 879 days.

(21) Appl. No.: 09/727,330

(22) Filed: Nov. 29, 2000

(65) Prior Publication Data

US 2002/0063871 A1 May 30, 2002

(51) Int. Cl.[7] ............................ G06F 15/00; G06K 1/00

(52) U.S. Cl. .......................... 358/1.4; 358/1.4; 358/1.9; 358/2.1; 358/502; 358/520; 347/16; 347/19; 347/41; 347/224; 347/236; 347/239; 347/240; 347/241; 347/244; 347/246; 347/251; 347/255; 347/256; 347/258

(58) Field of Search ........................... 358/1.4, 1.9, 2.1, 358/502, 520; 347/16, 19, 41, 49, 224, 236, 239, 240, 241, 244, 246, 251, 255, 256, 258

(56) References Cited

U.S. PATENT DOCUMENTS 4,734,868 A 3/1988 DeLacy
4,916,638 A 4/1990 Haselby et al.
5,388,517 A * 2/1995 Levien ....................... 101/485
5,592,202 A 1/1997 Erickson
5,600,350 A * 2/1997 Cobbs et al. ................. 347/19
5,905,512 A 5/1999 Beauchamp
6,158,344 A * 12/2000 Walker et al. .............. 101/484
6,257,143 B1 * 7/2001 Iwasaki et al. ............. 101/481
6,297,888 B1 * 10/2001 Noyes et al. ................ 358/1.9
6,375,307 B1 * 4/2002 Vinals et al. ................. 347/41
6,390,587 B1 * 5/2002 Subirada ...................... 347/19
6,623,096 B1 * 9/2003 Castano et al. ............... 347/19

FOREIGN PATENT DOCUMENTS

| | | |
|---|---|---|
| EP | 0 895 869 | 2/1999 |
| GB | 2 311 601 | 10/1997 |
| JP | 05-096796 | 4/1993 |
| JP | 11020248 | 1/1999 |

* cited by examiner

*Primary Examiner*—Kimberly Williams
*Assistant Examiner*—Michael Burleson

(57) ABSTRACT

A linefeed calibration method for identifying media advancement errors utilizes plural test patterns, including both a base pattern and an overlay pattern that are printed overlying each other to form an interference pattern. A sensor detects overall alignment of the interference pattern. That overall alignment is compared to alignment of at least a second interference pattern to identify a linefeed advance error. The error is correlated to a position on a media advancement mechanism such as a roller. A processor then adjusts the media advancement mechanism to correct the identified media advancement error. Under-advance errors, over-advance errors and skew errors may be identified using the described method.

20 Claims, 7 Drawing Sheets

FIG. 5A A+C
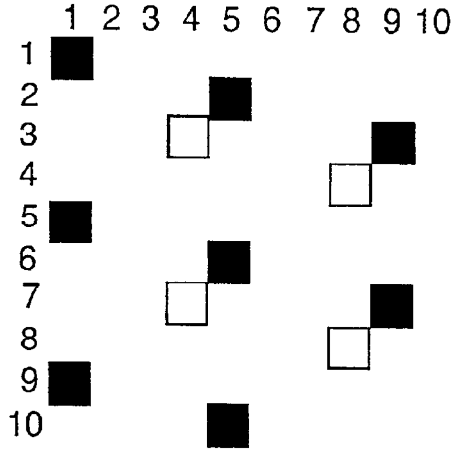
FIG. 5B A+D
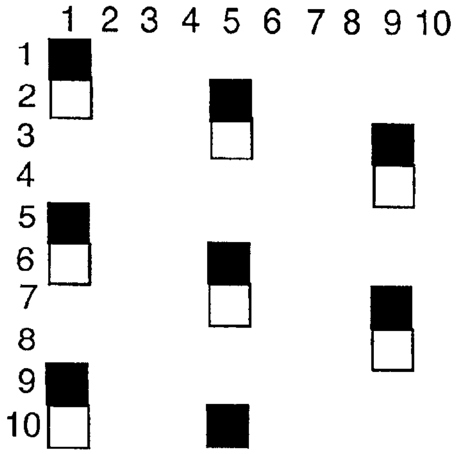
FIG. 5C A+E
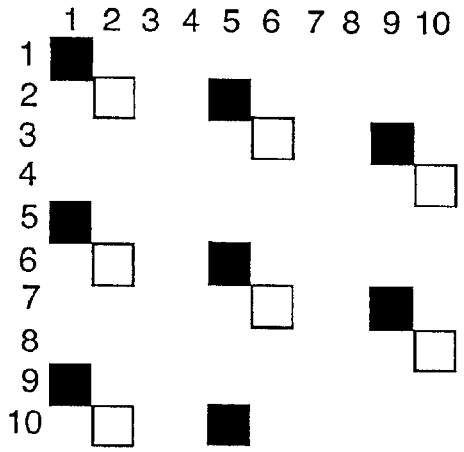
FIG. 5D A+F
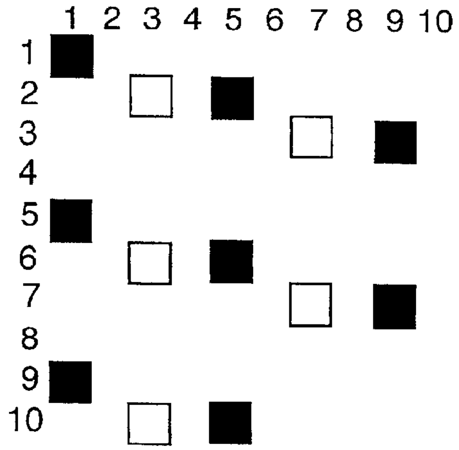
FIG. 5E A+G
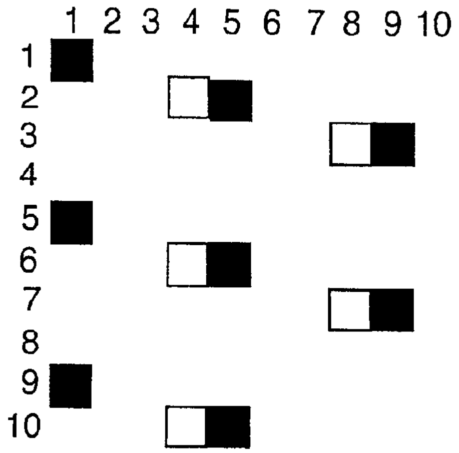
FIG. 5F A+H
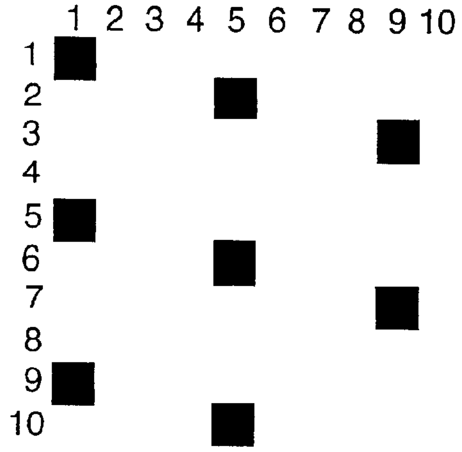

LINEFEED CALIBRATION METHOD FOR A PRINTER

TECHNICAL FIELD

The present invention relates generally to printers, and more particularly to a method that identifies and corrects paper-positioning errors in an inkjet printer.

BACKGROUND ART

Typically, media is advanced through a printer using a drive roller or feed roller. These generally cylindrical drive rollers advance media through the printer along a media path as the drive roller rotates about a drive shaft driven by a motor. Conventional drive roller mechanisms are susceptible to linefeed errors that cause paper-positioning inaccuracies. With the advent of more complex print jobs, paper-positioning accuracy has become increasingly important. To ensure paper-positioning accuracy, the drive roller advancing mechanism must be regulated to meet increased precision requirements and overcome problems associated with linefeed errors.

Linefeed errors can be characterized in at least two ways, run-out error and diametrical error. Run-out error is due to undesired eccentric rotation of the drive roller Diametrical error is due to a change in the diameter of the drive roller itself. Both types of error are caused by inaccuracies in the manufacture of drive rollers, and the result causes linefeed advance to be off by increments typically approximating less than 1⁄600 of an inch. Accordingly, manufacturing inaccuracies of drive rollers have presented a special problem in view of current printing requirements.

By identifying inaccuracies in media advancement due to the drive roller, the printer may be calibrated such that it adjusts and compensates for such inaccuracies. However, known linefeed calibration processes typically are expensive, and limited in their application. For example, one process includes using a pre-printed, pre-measured page, which is fed through a printer having a sensor that measures a distance between markings on the pre-printed page. The printer then compares the measured distance with a pre-measured, reference distance, and uses that comparison to determine whether the printer over- or under-advanced after each linefeed. Data identifying such over- or under-advancement is then stored in memory, and used to adjust linefeed advance. One problem with this calibration process is that it is based upon pre-printed media, which may not be of the same media type that the user may actually use in the printer. Moreover, the process only responds to an approximation of the problem because comparison of measured and reference distances occurs during manufacture of the printer and not in the actual user environment.

A second calibration process uses a calibration page that is printed by a printer, but then must be removed and placed in a scanner to measure print errors. This process is not desired because the requirement of using both a printer and a scanner increases production time and does not allow the printer to be tested in the actual user's environment.

What is needed is a process of calibrating linefeed in the user's environment with the user's choice of media. By providing a linefeed calibration process that can be completed by the user, production time and costs could be decreased during the manufacture process. Moreover, the ability of the user to calibrate a printer in the user environment will eliminate any errors due to variations between the manufacturer's environment and the user environment.

DISCLOSURE OF THE INVENTION

Briefly, the invention includes a linefeed calibration method and system for use in a printer. The printer includes a printhead with a first and a second group of nozzles, and a media advancement mechanism. A base pattern is printed on media using the first group of nozzles. Next, the media is advanced using the media advancement mechanism. An overlay pattern is printed using the second group of nozzles so the overlay pattern overlies the base pattern to form an interference pattern with a corresponding luminance. A sensor is used to detect luminance, which is compared with a reference luminance to identify a paper advancement error. The media advancement mechanism may then be adjusted to compensate for the media advance error.

BRIEF DESCRIPTION OF THE DRAWINGS

FIGS. 5A–5F are enlarged diagrammatic representations of interference patterns, each showing a base pattern as solid squares and an overlap pattern as blank squares.

DETAILED DESCRIPTION OF THE PREFERRED EMBODIMENT AND BEST MODE OF CARRYING OUT THE INVENTION

Figure 1:
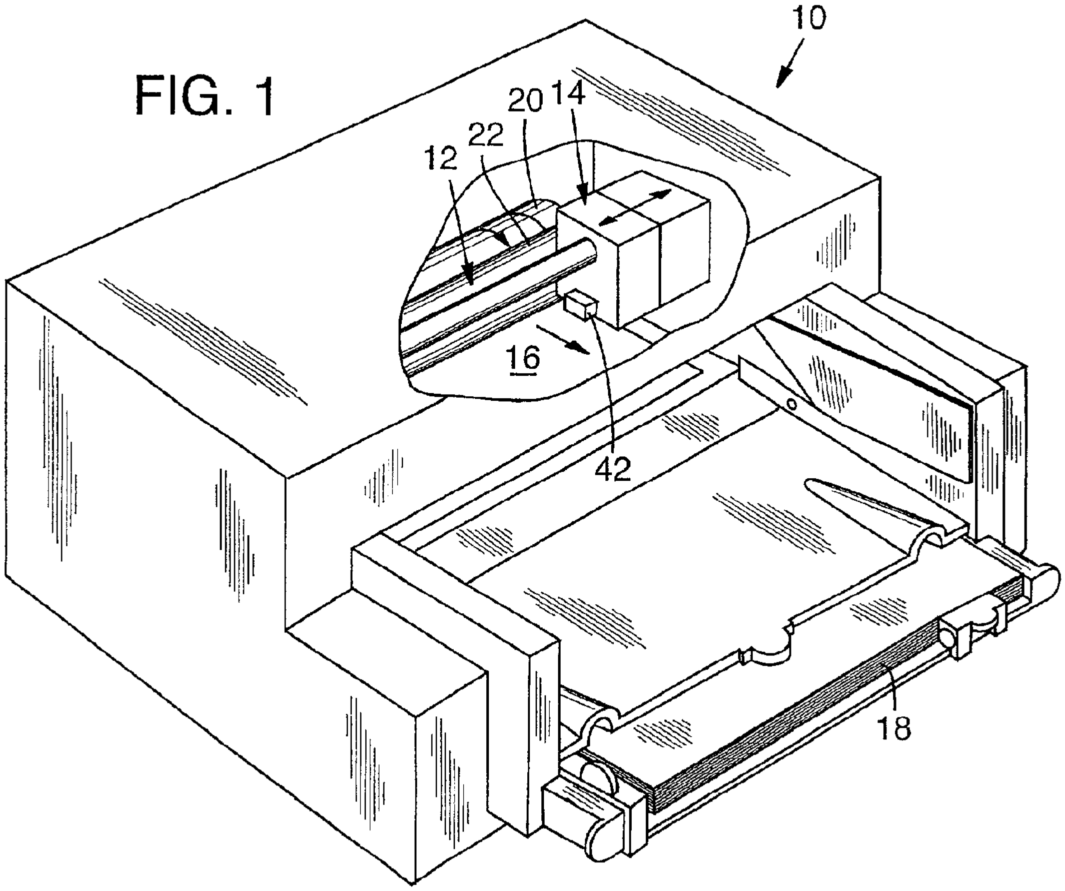
FIG. 1 is an isometric view of a printer, which is configured to employ a linefeed calibration method and system in accordance with the present invention.

Referring initially to FIG. 1, a printer is shown generally at 10, printer including a fragmented view of a media advancement mechanism 12 and a printhead 14. Printer 10 is configured to print on media (or media sheets) 16, where the media sheets are consecutively fed into a print region using media advancement mechanism 12. Each media sheet has a leading and trailing edge, where the leading edge is advanced along a media pathway past the printhead as indicated in FIG. 2.

Figure 2A:
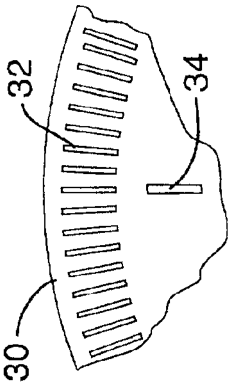
FIG. 2A is a further enlarged, fragmentary side view of an encoder which forms a part of the media advancement mechanism of FIG. 2.
Figure 2:
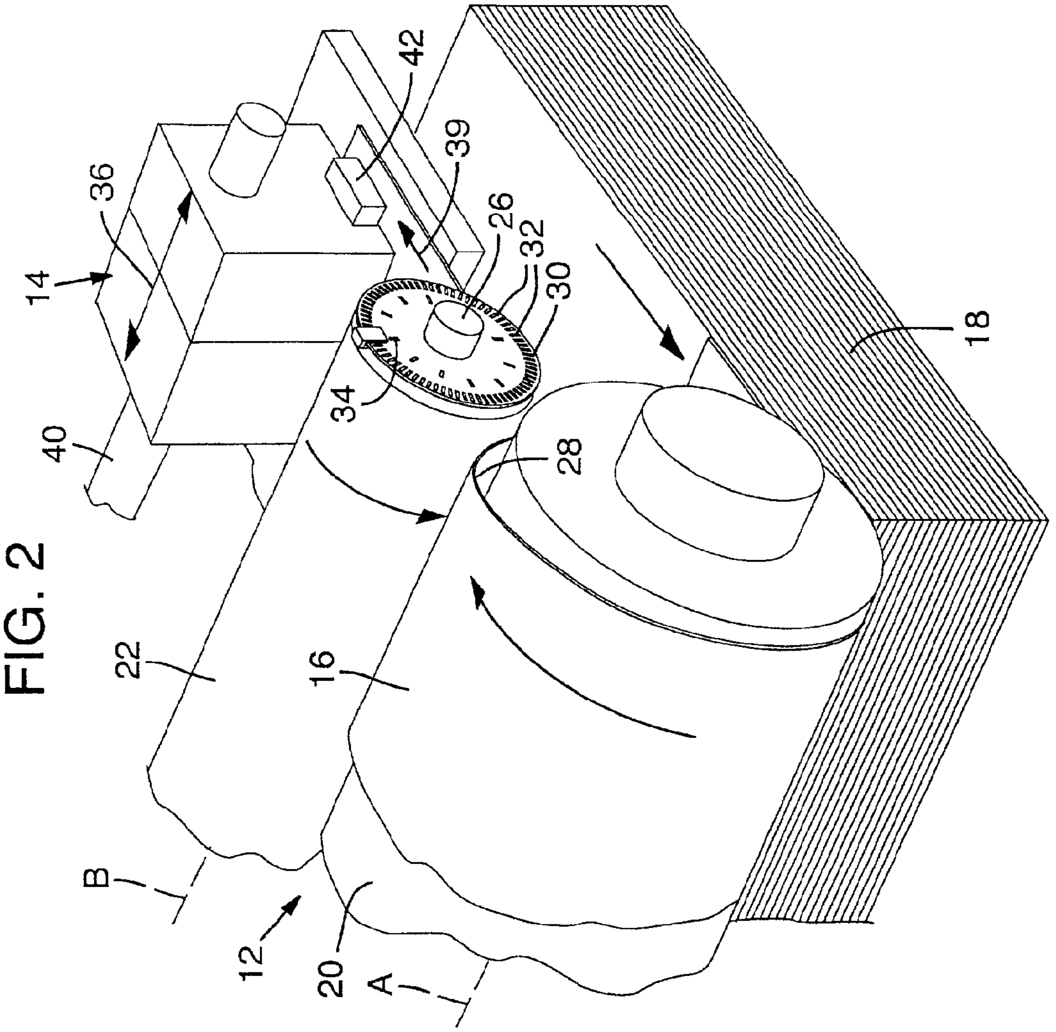
FIG. 2 is an enlarged, fragmentary, simplified isometric illustration of the media advancement mechanism and printhead of the printer shown in FIG. 1.

Referring now to FIG. 2, the media pathway through printer 10 is illustrated, and that pathway is defined by the media advancement mechanism including a pick roller 20 and a feed roller 22. Various combinations of pick and feed rollers are possible as know to those skilled in the art. One of the rollers may be thought of as a dominant roller, i.e. the roller which controls media advancement past the print region. In the depicted example, the feed roller is the dominant roller. As indicated in FIG. 2, pick roller 20 grabs a media sheet 16 from a media stack 18 and feeds it to feed roller 22.

Both the pick roller and the feed roller operate by rotating as shown in FIG. 2 and may be linked by suitable gear mechanism (not shown). Pick roller 20 has a larger diameter than feed roller 22 to provide a lower profile printer. The depicted pick roller has a diameter of approximately two inches while the depicted feed roller has a diameter of approximately one inch. A central pick roller shaft 24 extends approximately through the center of pick roller 20 and supports the pick roller for rotation about an axis A. The feed roller is supported by a central feed roller shaft 26, extending approximately through the center of the feed roller for rotation about an axis B. As shown, rotation of the two rollers advances the media along the media pathway; however, other configurations, which advance the paper, are contemplated.

As the media is advanced, variations in manufacture of the rollers may cause inaccuracies in paper positioning. Those variations are caused during manufacture because it is difficult to precisely locate the roller shafts in the center of the rollers. As a result, the shafts may be slightly off-center resulting in slight eccentric rotational movement. Moreover, manufacturing variations in a specified roller diameter will cause diametrical variance among rollers with some rollers having slightly larger diameters and others being slightly smaller than the specified diameter. One result of variations in roller diameters is that each printer must be separately calibrated.

Still referring to FIG. 2, linefeed error may be caused by the feed roller, the pick roller or the combined roller system. For example, the configuration of the feed and pick rollers may cause the media sheet to bubble or arch, as shown in an exaggerated way at 28, as it advances from the pick roller to the feed roller. Bubbling of media sheet 16 while it advances around pick roller 20 has the effect of bringing the media sheet out of contact with the pick roller, thereby negating any paper-positioning errors attributable to the pick roller. However, paper-positioning errors attributable to the feed roller must also be dealt with as will be described below.

To deal with such errors attributable to the feed roller, the media advancement mechanism includes an encoder, such as an optical encoder 30, which enables identification of the position of the feed roller. For example, encoder 30 has optical flags or markings, which are used to identify incremental positions of the feed roller. As shown in FIG. 2A, the encoder has a mark corresponding to a zero position (shown at 34) which identifies a zero position of the feed roller. A series of additional markings allow identification of the feed roller relative to the zero position. An example of such an encoder is described in U.S. Pat. No. 5,929,789 to Berbehenn for an invention entitled Single Channel Incremental Position Encoder With Incorporated Reference Mark, and that patent is incorporated herein by reference. By including an encoder on the dominant roller (the feed roller in this case), the printer is able to locate the exact position of the roller as it advances a sheet of media through the printer. As will be described in further detail, the to-be-described linefeed calibration process of the invention links an identified linefeed advance with a corresponding position on the dominant roller as identified by the encoder.

Still referring to FIG. 2, the printer has an onboard processor (not depicted) which controls media advancement mechanism 12. After a media advancement error has been identified and linked to a roller position via the encoder, the processor then adjusts the roller by controlling rotational movement corresponding to the identified media advancement error.

As described previously, media advancement mechanism 12 advances media 16 past printhead (or pen) 14. Printer 10 may include any number of pens. Two representative pens are depicted in FIGS. 1 and 2, however only one pen is necessary to print the to-be-described calibration patterns. The pens may be contained in a carriage which supports the pens. The pens are configured to travel in an x-direction 36 (shown by bold arrows on top of the pens in FIG. 2), which is a perpendicular to a paper advance or y-direction 39. The pens are moved back and forth in the x-direction by a motor (not shown) along a support rod 40.

A suitable sensor or detector 42, such as an optical one, is used to detect a pattern printed by the pen. As shown, optical sensor 42 is mounted on a pen or carriage and moves transversely across the media with the pen or carriage. The detector is positioned upstream of the pen such that any marks printed by the pen can be detected by the sensor. The typical optical sensor detects printed marks on the media by detecting the intensity of light from a pattern. More particularly, the optical sensor includes a light-emitting diode which projects light downward onto the media; the light is then reflected back to the detector. Where there is print on the media, the light is diffused such that the detector detects a lower intensity of light.

Figure 3:
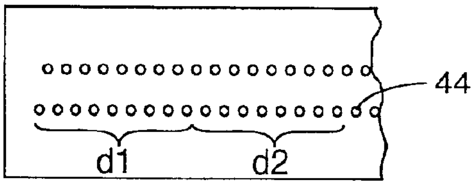
FIG. 3 is an enlarged, fragmentary bottom view of the printhead shown in FIGS. 1 and 2 with plural nozzles divided into two groups.

Referring to FIGS. 2–3, pen 14 of printer 10 includes a plurality of nozzles 44 on the bottom surface of the pen. When printing, the nozzles are fired such that ink is shot at the media to make a mark or dot. In FIG. 3, a bottom view of a pen includes a double column of staggered nozzles. The columns of nozzles extend in the y-direction, the direction of the media advance. For reasons to be described, a useful characteristic of the nozzles has to do with their relative spacing in the pen, and this characteristic is referred to in the field as vertical nozzle spacing. Although the figure represents a small number of nozzles, the pen actually contains a large number of nozzles. A typical pen may include 304 nozzles, actual vertical nozzle spacing may be 1/600-inch, and each pen may be slightly over one half an inch in length.

During printing, not all nozzles must fire together. Rather the nozzles are selected, such that the appropriate nozzles are fired at the appropriate time. Each nozzle can make a separate dot. Depending on the arrangement and spacing of the nozzles, various print jobs require specialty firings to produce desired colors or print font. For the disclosure herein, the pen has been split into two separate groups of nozzles, $d_1$ and $d_2$, as illustrated by two representative bracketed groups of nozzles in FIG. 3A. First group of nozzles $d_1$ is positioned ahead of second group $d_2$, such that group $d_1$ prints on the page above the place that is printed by group $d_2$. The representation is not intended to limit the number of nozzles per group, nor is it meant to identify which nozzles belong to which group.

Having described the various printer-related components above, the disclosed linefeed calibration process will now be described generally. A first step includes having the pen print a plurality of interference patterns. Next, the sensor distinguishes the interference patterns by the amount of luminance or light reflected back from each pattern. The luminance is essentially a measurement of the white space of each pattern. Thereafter, the amount of luminance is correlated with an advancement error that is associated with a rotational position of the media advancement mechanism by use of the optical encoder. The processor then adjusts the media advancement mechanism at each position to correct for the advancement error at that position.

The calibration patterns include a pre-defined first pattern or base pattern, which is printed on a media. The base pattern is printed by a first group of nozzles. The media is then advanced with the feed roller such that a second or overlay pattern may be printed on top of the base pattern by a second group of nozzles. As the paper advances, the second group of nozzles aligns with the base pattern so that when the second group of nozzles are fired the overlay pattern prints on top of the base pattern. It is not necessary to use all of the nozzles and create a relatively large pattern, since a relatively small advance and small pattern such as 75/600-inch based on the vertical nozzle spacing has proven to be adequate.

Figure 4:
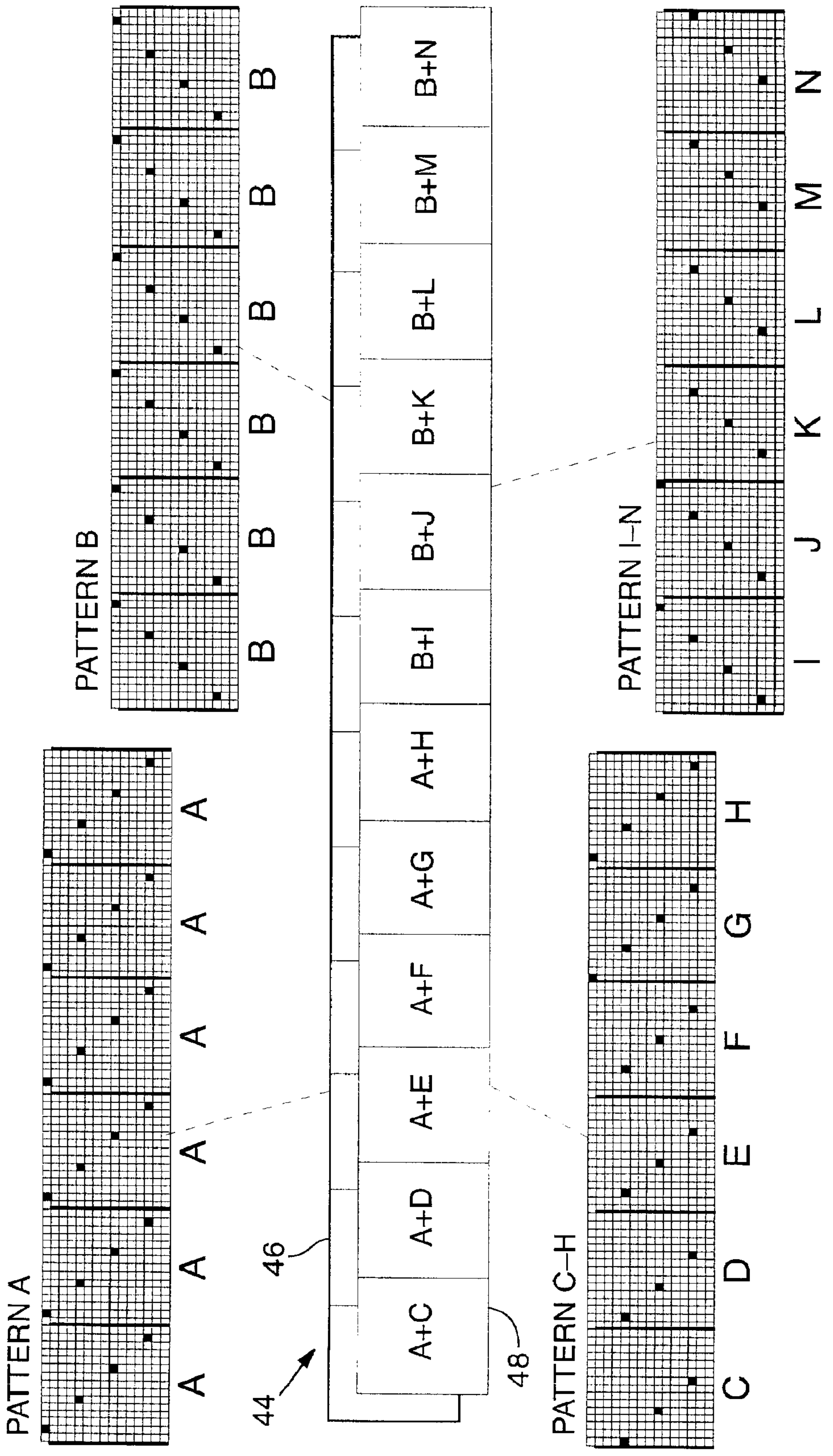
FIG. 4 is a representation of a calibration line, showing 12 panels with two base patterns, A and B, and 12 overlay patterns, C–N.
Figure 6:
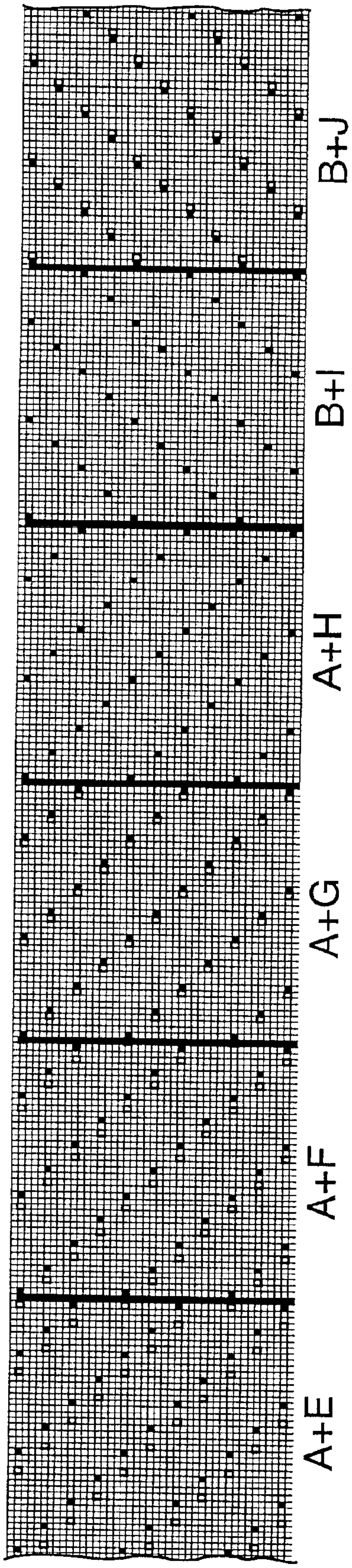
FIG. 6 is an enlarged fragment of a calibration line like that of FIG. 4, showing four panels with base pattern A and two panels with base pattern B overlapped by overlap patterns E–J.

Turning now to FIGS. 4–6, a more detailed description of the disclosed calibration process follows. In FIG. 4, the disclosed embodiment uses a total of 14 patterns, A–N, each pattern being comprised of specifically arranged dots. These dot patterns are printed by the pen in a predefined configuration and in a standard-sized panel to determine if there is an error in the linefeed advance and the amount of that error. The panels may be of any grid size suitable to distinguish the patterns. In FIG. 4, the panels are shown as grids of 15-units (in the x-axis) by 15-units (in the y-axis), while in FIG. 5 the panels are represented as grids of 10-units by 10-units and in FIG. 6 the panels show a more representative panel which is a grid of approximately 42-units by 42-units. The units in the depicted panel in FIG. 6 are demonstrative of a pattern where the units in the x-axis are approximately 1/2400-inch and the units in the y-axis are approximately 1/600-inch. The y-axis units are representative of the vertical nozzle spacing. Moreover, this disclosure demonstrates the use of 14 patterns, however, any number of patterns may be used in the practice of the invention.

Within the 14 patterns, there are at least two main groups of patterns. Each pattern is composed of dots which are ink droplets directed for placement by initiating a certain pattern of nozzles to fire. The first group of patterns includes patterns A (a base pattern) and C–H (overlay patterns). As shown in both FIGS. 4 and 6, that first group has dots which form what may be thought of as dot lines descending from the left side to the right side of a standard sized panel, and therefore the dot lines of the first group have a negative slope. Similar to the first group, the second group of patterns includes patterns B (a base pattern) and I–N (overlay patterns). However, unlike the first group, dot lines associated with the second group have dots which run in a line ascending from the left side to the right side of a standard sized panel, and therefore the dot lines of the second group have a positive slope.

To practice the present invention, it is not necessary to print the first and second group of patterns in a specific order. For example, either the first or the second group could be printed first.

Within each group, the overlay patterns are differentiated by the position of the dots within a given overlay pattern. Viewing successive overlay patterns, the dots are shifted along a horizontal or x-axis which is perpendicular to the direction of the paper advance or y-axis. In the first group of overlay patterns (C–H), the shift is along the negative x-axis, while the shift is along the positive x-axis in the second group of overlay patterns (I–N). In each group, one overlay pattern matches a base pattern such that in the first group pattern H matches base pattern A, while in the second group pattern I matches base pattern B.

In connection with the line calibration process, the pen makes a first sweep such that the first group of nozzles prints a series of panels on the media sheet. As used herein, the term 'sweep' refers to a plurality of panels printed adjacent each other along the horizontal or x-axis. For example, a base sweep includes a plurality of base patterns printed adjacent each other. An overlay sweep includes a plurality of overlay patterns printed adjacent each other.

As shown in FIG. 4, the sweep includes 12 panels where each panel has both a base sweep including plural base patterns and an overlay sweep including plural overlay patterns. The base sweep is comprised of base patterns A and B. For example, the base sweep includes pattern A in each of the first six panels, and in each of the latter six panels pattern B may be printed. The media sheet is then advanced so that the second group of nozzles is aligned with the first printed base sweep.

The second or overlay sweep is then printed on top of the base sweep. As illustrated, each of the 12 panels in the overlay sweep has different patterns from the adjacent panel. A first panel in a sweep refers to the panel on the far left side of the sweep, the second panel refers to the panel adjacent and to the right of the first panel. Therefore, in the overlay sweep, the first panel has pattern C, while the second panel has pattern D, the third panel has pattern E and so forth.

The combination of a base pattern and an overlay pattern create an interference pattern. Where the combination of a base sweep plus an overlay sweep yields a calibration line. In FIG. 4, a calibration line is shown at 44 with the base sweep (shown at 46) shadowed by the overlay sweep (shown at 48). Therefore in the calibration line, the first panel includes base pattern A with overlay pattern C or C+A interference pattern, the second panel has overlay pattern D on top of base pattern A or D+A interference pattern, the third panel has overlay pattern E on top of base pattern A or E+A interference pattern, . . . the seventh panel has overlay pattern I on top of base pattern B or I+B interference pattern, . . . and the twelfth panel has overlay pattern N on top of base pattern B or N+B interference pattern.

The base pattern and overlay pattern are shifted within each panel depending on the accuracy of the media advancement. Since each pattern is a sequence of dots, the less overlap between the base and overlay pattern the darker the interference panel or pattern appears. Hence, optical sensor 42 can be used to detect overlap in the interference patterns because at the point of maximum overlap, the luminance will also be maximized. This luminance is maximized where there has been the most overlap of the two patterns between the sweeps. Effectively, the optical sensor is detecting y-axis error, or paper advance error, by the offset in the x-axis. The maximum luminance occurs in the pattern where the x and y-axis coincide.

The depicted embodiment is extremely sensitive to linefeed error. Each of the patterns as depicted use a 600 dpi pen and is printed on a 2400 dpi (dots per inch) horizontal resolution and a 600 dpi vertical resolution grid or panel. As described previously, each of the overlay patterns C–N is shifted in the horizontal axis. Each adjacent overlay pattern is shifted from its neighboring pattern. For example, the shift may be such that the dots are shifted 1/2400-inch in the horizontal direction or x-axis. The shift could also be 1/1200-inch or any other shift that would allow one to interpolate the linefeed advance error in accordance with the disclosure. It must be remembered that the values chosen may vary depending on the pen resolution. Hence the patterns may be depicted with a 720 dpi vertical resolution and/or a $1/2880$-inch shift if a pen having 720 dpi is used. Likewise, other pens are contemplated.

Thus, referring to FIG. 4, the shift in the patterns is explained by the following example. Base patterns A and B are references such that each base pattern has an exact replica, unshifted corresponding overlay pattern. In particular, where overlay pattern H is the same as base pattern A, then pattern H is shifted 0/2400s from base pattern A. Since each overlay pattern is shifted from its neighboring pattern, then overlay pattern G would be shifted $1/2400$-inch from overlay pattern H and base pattern A, overlay pattern F would be shifted $1/2400$-inch from overlay pattern G and $2/2400$-inch from base pattern A, pattern E would be shifted $1/2400$-inch from pattern F and $3/2400$-inch from base pattern A. Likewise, where overlay pattern I is the same as base pattern B, pattern J would be shifted $1/2400$-inch from pattern I and base pattern B, pattern K would be shifted $1/2400$-inch from pattern J and $2/2400$-inch from base pattern B, and pattern L would be shifted $1/2400$-inch from pattern K and $3/2400$-inch from base pattern B.

Using FIG. 5, the shift in the patterns is readily apparent. In FIG. 5, the base pattern is shown in solid squares and the overlap pattern is shown in blank squares. FIG. 5A is a diagrammatic representation of one interference panel with the base pattern A and the overlap pattern C of FIG. 4. FIG. 5B is a diagrammatic representation of one interference panel with the base pattern A and the overlap pattern D of FIG. 4. FIG. 5C is a diagrammatic representation of one interference panel with the base pattern A and the overlap pattern E of FIG. 4. FIG. 5D is a diagrammatic representation of one interference panel with the base pattern A and the overlap pattern F of FIG. 4. FIG. 5E is a diagrammatic representation of one interference panel with the base pattern A and the overlap pattern G of FIG. 4. FIG. 5F is a diagrammatic representation of one interference panel with the base pattern A and the overlap pattern H of FIG. 4.

FIG. 5 permits measurement of the shift of the base pattern. For example, in FIG. 5A, using a grid with horizontal x-position, vertical y-position coordinate identification, base pattern A has a dot at coordinate (1,1), a dot at coordinate (2,5), a dot at coordinate (3,9) and so forth. Overlay pattern C has a dot at (3,4), one at (4,8), etc. The shift in the x-axis between base pattern A and overlay pattern C is 5 units as best shown on horizontal grid line 3, where base pattern A's dot is located at (3,9) and C's dot is located at (3,4). The shift is 9–4 or 5 units. In FIG. 5B, the overlay pattern D is found on (3,5) which is 4 units from base pattern A. Similarly, in FIG. 5C, overlay pattern E is shifted 3 units from base pattern A. In FIG. 5D, overlay pattern F is shifted 2 units from base pattern A. In FIG. 5E, overlay pattern G is shifted 1 unit from base pattern A. And finally in FIG. 5F, the shift between base pattern A and overlay pattern H is 0 units and there is maximum overlap between the two patterns.

The interference patterns are used to detect the linefeed advance. The advance used for calibration of the linefeed is based on the vertical nozzle spacing such that the second group of nozzles aligns with the print of the first group of nozzles. To determine the linefeed error, one must compare the detectable degree of alignment or luminance of the interference pattern with a reference luminance. The reference luminance may include comparing the overlay pattern and the base pattern or may include comparing different interference patterns with each other. For example, if the advance is accurate, then an overlay pattern which is identical to a particular base pattern should align exactly with the base pattern.

For illustration using FIGS. 5 and 6, where the advance is set at $75/600$-inch then, if the advance was in fact a $75/600$-inch advance (and not an over- or under-advance), then the overlay sweep would create an interference pattern where base pattern A and pattern H would rest exactly on top of each other. The dots in the interference pattern A+H should exactly overlap because pattern A and H are the exact same pattern—there is no shift in the dots. Likewise, pattern B and I would also fall on each other in interference pattern B+I with a perfect shift of $75/600$s because base pattern B and overlay pattern I are also identical. Hence, in FIG. 5F and in FIG. 6, the panels marked A+H and B+I show exact overlap and an exact advance.

However, if the advance was not exactly $75/600$'s of an inch, then the interference patterns may be used to determine the error in linefeed advance. Hence, if patterns A and H as well as B and I do not fall exactly on each other, then the advance was not exactly $75/600$'s and therefore a linefeed error has occurred.

Figure 8:
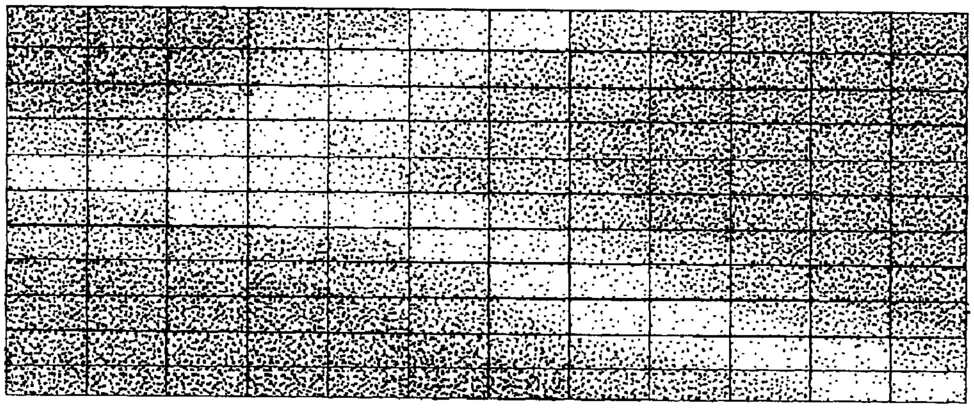
FIG. 8 depicts an enlarged conceptualized linefeed test plot showing 11 calibration lines each with 12 interference panels.

Not only can the calibration panels be used to identify an error in linefeed advance, the panels can also identify the type of error, i.e. an under- or over-advance. By identifying which panel in a calibration line has the most luminance compared with the surrounding panels, the error type may be identified. Therefore, since the patterns in the first group all have a negative slope, when the media is over-advanced the maximum overlap will occur among the interference patterns derived from that group. However, if there is an under-advance, the maximum overlap will occur among the interference patterns derived from the second group. Referring to FIG. 8, the fifth row shows a calibration line where the luminance is greatest in the first few panels on the left side of the page. Since the panels on the left side are panels of the first group and hence show an over-advance for the associated feed roller position. In the eleventh row, the calibration line has the most luminance in the panels to the far right side of the page. These panels are of the second group, and hence, an under-advance is shown for the associated feed roller position.

Another advantage of the present embodiment is the ability to determine the precise amount of linefeed error. After the second sweep has been printed on the media, the overlap of each panel may be recorded. Then by comparing each panel's overall luminance, the panel with the maximum amount of luminance can be identified. For example, since the patterns C–N are all shifted by $1/2400$-inch in the horizontal direction, the amount of over- or under-advance can be determined to an error value of $1/2400$-inch. Moreover, by interpolation one may be able to calibrate to a higher resolution.

To illustrate, suppose in the overlay sweep the maximum luminance occurred in a panel with an interference pattern comprising base pattern A and overlap pattern G. Pattern G is a pattern from the first group and hence the error will be identified as an over-advance. The amount of over-advance is dependent on the amount of shift in the dots along the x-axis in the overlap pattern G. Since pattern G is shifted $1/2400$-inch off of base pattern A, the over-advance of the media was by $1/2400$-inch.

The process of identifying the amount of under-advance is similar to the process of identifying over-advance. Suppose that the maximum luminance occurred in a panel with base pattern B and overlap pattern J, a pattern from the second group. The second group patterns identify an under-advance of the media. Thus, if pattern J is shifted $2/2400$-inch off of pattern B, then if the interference pattern including J and B is the most ruminant, the under-advance would be $2/2400$-inch.

Figure 7A:
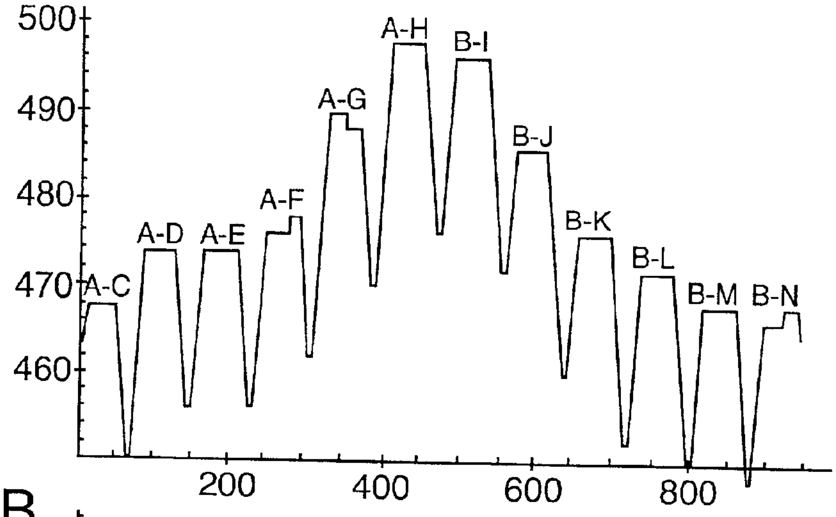
FIGS. 7A–7C are graphs of a calibration line plotting luminance vs. distance.
Figure 7B:
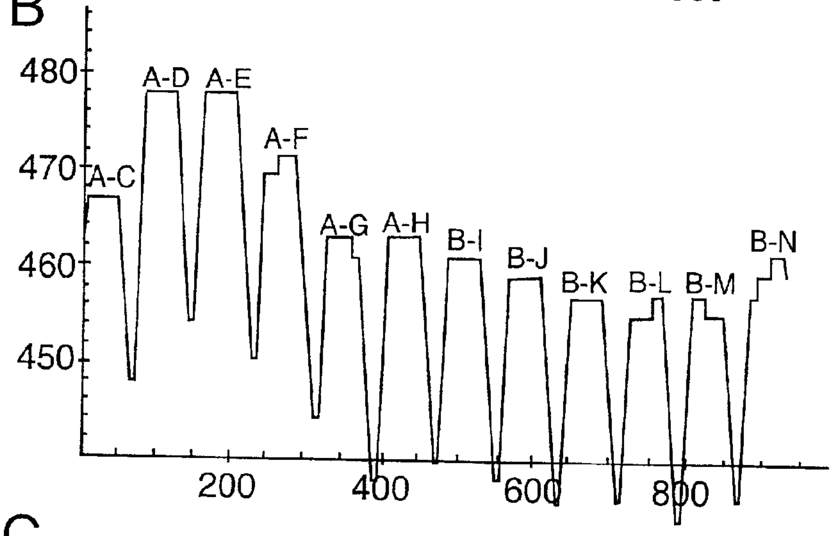
Figure 7C:
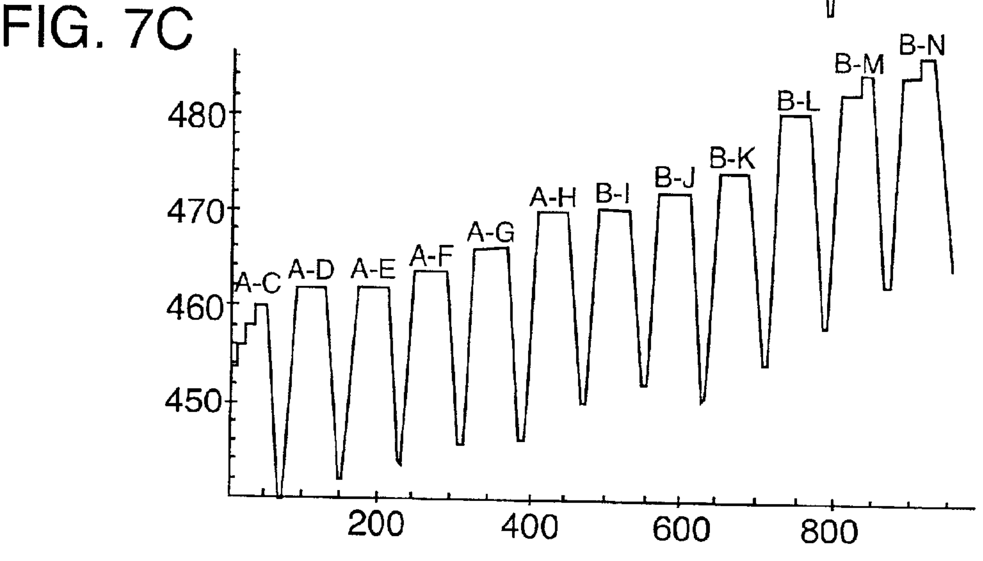

The graphs presented in FIG. 7 plot the luminance of individual calibration lines to identify paper advancement error. The calibration lines are comprised of plural interference panels. The height of a peak is dependent on the amount of luminance of the interference panel, such that the highest peak will correspond to the panel with the highest luminance. Linefeed error can then be interpolated and associated with a position on the media advancement mechanism. Hence, each graph represents a different position on the media advancement mechanism. FIG. 7A shows a position where the linefeed advance is accurate. FIG. 7B shows a position where the linefeed advance is an over-advance. FIG. 7C shows a position where the linefeed advance is an under-advance.

More particularly, in FIG. 7A, there are 12 peaks corresponding to the 12 interference panels. Such a graph is representative of the calibration line found in the first row of FIG. 8 where the middle panels have the most luminance. Each interference panel has a base pattern, A or B, and an overlap pattern C–N. Panels 6 and 7 have respectively base pattern A and overlay pattern H, and base pattern B and overlay pattern I. As described previously, patterns A and H are the exact same as are patterns B and I. Hence, where the linefeed advance is accurate, one would expect the patterns that are the same to fall exactly on top of each other such that these panels would be the most ruminant. In FIG. 7A, the highest peak correlates to panel 6, with panel 7 being second. Since panel 6 has an interference pattern including patterns A and H, then one could assume that the advance was accurate. However, one could also conclude that since panel 6 is higher than panel 7 that there may be a relatively small amount of over-advance. The particular amount of over-advance could be determined by setting the peak values as variables in a suitable algorithm.

In FIG. 7B, the two highest peaks are peak 2 and peak 3. That graph is representative of the calibration line found in the fifth row of FIG. 8 where the far left panels have the most luminance. Peak 2 in FIG. 7B correlates to interference panel 2 having base pattern A and overlap pattern D, while peak 3 correlates to interference panel 3 having base pattern A and overlap pattern E. Since all the patterns are in the first group, the error in advance can be understood as an over-advance. Since pattern D is shifted $\frac{4}{2400}$-inch on the x-axis from pattern A, and peak 3 is the highest, then the over-advance would be $\frac{4}{2400}$-inch. While if peak 4 is the highest, then the over-advance would be $\frac{3}{2400}$-inch because pattern E is shifted $\frac{3}{2400}$-inch from pattern A. However, it appears that peak 2 and peak 3 are the same height such that one may interpolate that the over-advance error is between $\frac{3}{2400}$-inch and $\frac{4}{2400}$-inch.

In FIG. 7C, the associated calibration line is found in the last row of FIG. 8 where the far right panels have the most luminance. In FIG. 7C the highest peak corresponds to panel 12. Panel 12 has base pattern B and overlay pattern N. As a pattern from the second group, maximum luminance in pattern N shows that there is an under-advance error. Where panel 12 is the most ruminant the linefeed error is at least $\frac{5}{2400}$-inch because pattern N is shifted $\frac{5}{2400}$-inch from pattern A.

FIG. 8 is an enlarged schematic representation of a test plot including plural calibration lines. Each horizontal row represents a calibration line associated with a position on the media advancement mechanism. In each row, the most ruminant interference panel is identified using the process described above and the linefeed advance error is calculated. The test plots can be repetitively printed extending the entire length of a media sheet such that the advance error of each position may be averaged. A processor links the advance error with a position on the media advance mechanism identified by the encoder described above. The correction values and the linked media advance mechanism positions may be stored in the printers' memory or processor in the form of tabulated values or as variables to input into a standard formula. The processor then controls subsequent print advances by correcting the determined error for each position on the media advance mechanism.

Figure 9:
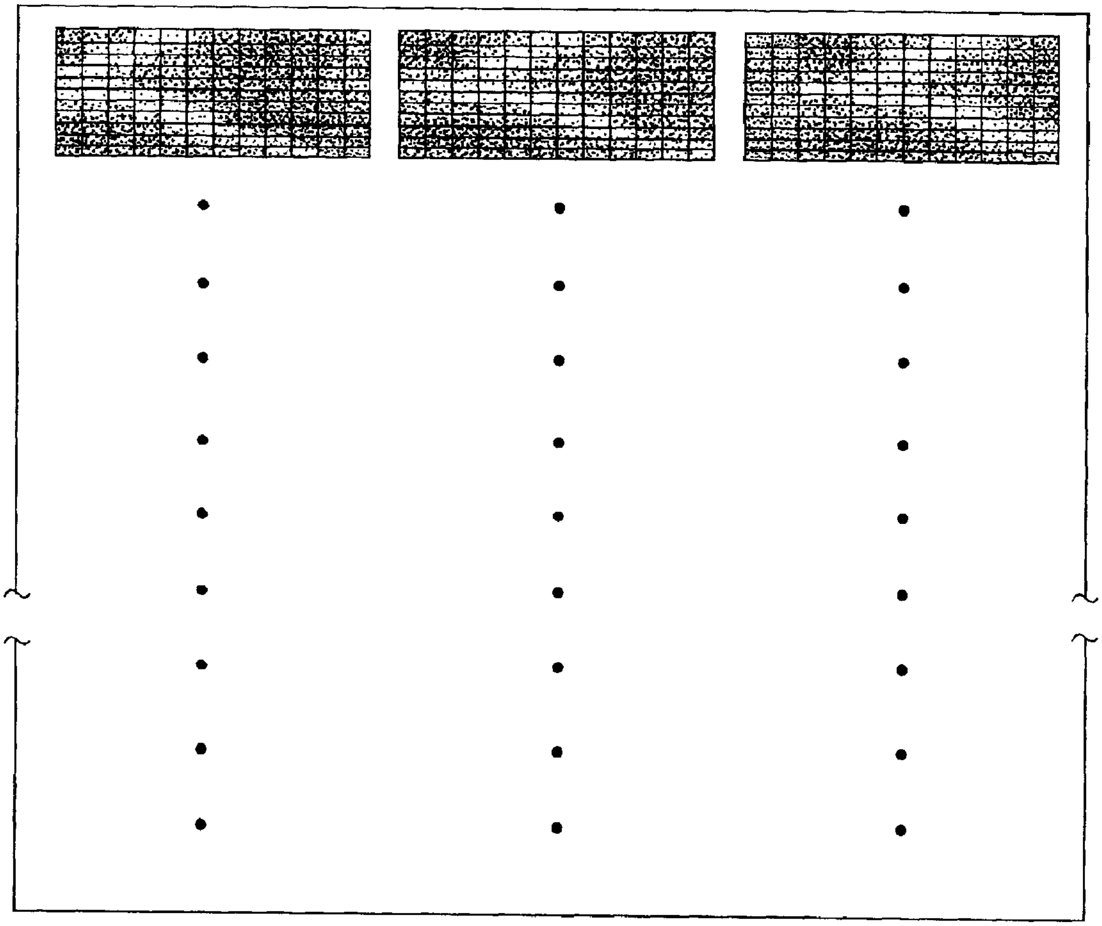
FIG. 9 is a representation of a calibration sheet with the plural test patterns of FIG. 8 being used to determine skew error.

FIG. 9 shows another embodiment of the invention. A plurality of test plots may be printed across the media such that a skew error can be identified. A skew error is a paper advance error where the media is advanced in an oblique direction such that the print is not aligned. By comparing the pattern overlay in the three test plots replicated across the page, an error in skew may be identified. In FIG. 9, plural blocks represent individual test plots. The test plots are shown vertically as separated plots but alternatively the plots could run continuously down the media sheet. The horizontal x-axis repetition of the test plots allows for identification of skew error. A change in position of the most ruminant pattern in each calibration line or test plot between the three horizontal test plots could be used to identify an error with skew since if one edge of the paper is further advanced then the patterns will reflect the change when comparing the test plots.

The position of the most ruminant pattern would change such that the most ruminant panel in the first calibration line of the first plot could be shown as the third and fourth panels. Then in the first calibration line of the second plot adjacent to the first calibration line of the first plot, the most ruminant panel could be shown in the fifth and sixth panels. Then in a third plot adjacent the second plot, the most luminant panel may be shown in the seventh and eighth panels. Changes from an over-advance to a true-advance to an under-advance represent a skew error of the media sheet.

Accordingly, while the present invention has been shown and described with reference to the foregoing preferred embodiments, it will be apparent to those skilled in the art that other changes in form and detail may be made therein without departing from the spirit and scope of the invention as defined in the appended claims.

I claim:

1. A linefeed calibration method for use with an inkjet printer, the inkjet printer having a printhead with a first group of nozzles and a second group of nozzles different from the first group of nozzles, and having a media advancement mechanism, the method comprising:

printing on media in a first sweep, a base pattern with a first group of nozzles of the printhead;

advancing the media with the media advancement mechanism;

printing on the media in a second sweep, an overlay pattern with the second group of nozzles of the printhead, the overlay pattern overlying the base pattern to form an interference pattern with a luminance representative of pattern alignment;

detecting the luminance of the interference pattern with a sensor; and comparing the luminance of the interference pattern with a reference luminance to identify a paper advancement error.

2. The linefeed calibration method of claim 1, further comprising coordinating the paper advancement error with a position on the media advancement mechanism.

3. The linefeed calibration method of claim 1, further comprising adjusting the media advancement mechanism to compensate for the paper advancement error.

4. The linefeed calibration method of claim 1, wherein the sensor is an optical detector.

5. The linefeed calibration method of claim 1, wherein the base pattern and overlay pattern are identical.

6. The linefeed calibration method of claim 1, wherein the overlay pattern is offset from the base pattern along a horizontal axis perpendicular to a media advance direction.

7. The linefeed calibration method of claim 1, wherein the reference luminance is the luminance of a second interference pattern.

8. The linefeed calibration method of claim 1, wherein the media advancement mechanism includes a feed roller.

9. A linefeed calibration method for use with an inkjet printer, the inkjet printer having a printhead with a first group of nozzles and a second group of nozzles, and having a media advancement mechanism which includes a pick roller, the method comprising:

printing on media a base pattern with a first group of nozzles;

advancing the media with the media advancement mechanism;

printing an overlay pattern with the second group of nozzles, the overlay pattern overlying the base pattern to form an interference pattern with a luminance representative of pattern alignment;

detecting the luminance of the interference pattern with a sensor; and comparing the luminance of the interference pattern with a reference luminance to identify a paper advancement error.

10. A linefeed calibration method for a printer, the method comprising:

printing on a media sheet a base sweep including at least a first base pattern and a second base pattern;

advancing the media sheet;

printing on the media sheet, an overlay sweep overlying the base sweep to form a calibration line, the overlay sweep including at least a first overlay pattern and a second overlay pattern, such that the first overlay pattern is printed on the first base pattern to form a first interference pattern with a detectable degree of alignment and the second overlay pattern is printed on the second base pattern to form a second interference pattern with a detectable degree of alignment; and comparing the detectable degree of alignment of the first interference pattern with the detectable degree of alignment of the second interference pattern to identify an alignment variance to identify an advance error.

11. The linefeed calibration method of claim 10, wherein the printer includes a media advancement mechanism having an identifiable position, the method further comprising coordinating the advance error with the identifiable position on the media advancement mechanism.

12. The linefeed calibration method of claim 10, wherein the printer includes a media advancement mechanism having an identifiable position, the method further comprising adjusting the media advancement mechanism to compensate for the advance error.

13. The linefeed calibration method of claim 10, wherein the first overlay pattern is offset in a horizontal direction from the second overlay pattern.

14. The linefeed calibration method of claim 10, wherein the first overlay pattern is identical to the first base pattern.

15. The linefeed calibration method of claim 10, wherein the first base pattern and second base pattern are identical.

16. The linefeed calibration method of claim 10, wherein a sensor detects the degree of alignment of the first interference pattern and the degree of alignment of the second interference pattern.

17. The linefeed calibration method of claim 10, wherein the linefeed error is an over-advance.

18. The linefeed calibration method of claim 10, wherein the linefeed error is an under-advance.

19. The linefeed calibration method of claim 10, wherein the media sheet has a length and the printer includes a media advancement mechanism, the method further comprising printing a plurality of calibration lines extending the length of the media sheet each calibration line having an advance error;

coordinating the advance error of each calibration line with an identifiable position on the media advancement mechanism; and adjusting the media advancement mechanism to compensate for the advance error for each identifiable position.

20. A method for detecting paper advance error in an inkjet printer, the printer having a media advance mechanism, the method comprising:

printing on a media sheet a first base sweep and a second base sweep positioned on an x-axis;

advancing the media sheet along a y-axis with the media advance mechanism;

printing on a media sheet a first overlay sweep overlying the first bass sweep to form a first calibration line with a detectable degree of alignment and a second overlay sweep overlying the second base sweep to form a second calibration line with a detectable degree of alignment; and comparing the degree of alignment of the first calibration line with the degree of alignment of the second calibration line to determine if there is a skew error.

* * * * *

UNITED STATES PATENT AND TRADEMARK OFFICE
CERTIFICATE OF CORRECTION

PATENT NO. : 6,940,618 B2
APPLICATION NO. : 09/727330
DATED : September 6, 2005
INVENTOR(S) : Erick Kinas It is certified that error appears in the above-identified patent and that said Letters Patent is hereby corrected as shown below:

Column 1, line 25, after “roller” insert --.--

Column 8, line 66, delete “ruminant” and insert therefor --luminant--

Column 9, line 25, delete “ruminant” and insert therefor --luminant--

Column 9, line 57, delete “ruminant” and insert therefor --luminant--

Column 9, line 64, delete “ruminant” and insert therefor --luminant--

Column 10, line 20, delete “ruminant” and insert therefor --luminant--

Column 10, line 26, delete “ruminant” and insert therefor --luminant--

Column 10, line 27, delete “ruminant” and insert therefor --luminant--

Column 10, line 30, delete “ruminant” and insert therefor --luminant--

Column 12, Claim 20, line 44, delete “bass” and insert therefor --base--

Signed and Sealed this

Twelfth Day of December, 2006

JON W. DUDAS
*Director of the United States Patent and Trademark Office*